United States Patent [19]

Kawata et al.

[11] Patent Number: 5,646,224

[45] Date of Patent: Jul. 8, 1997

[54] RUBBER COMPOSITION

[75] Inventors: Takashi Kawata; Shoei Tsuji, both of Mie-ken; Yoji Mori, Yokkaichi, all of Japan

[73] Assignee: Japan Synthetic Rubber Co., Ltd., Tokyo, Japan

[21] Appl. No.: 580,998

[22] Filed: Jan. 3, 1996

[30] Foreign Application Priority Data

Jan. 19, 1995 [JP] Japan ................................. 7-023290

[51] Int. Cl.$^6$ .......................... C08L 23/16; C08L 19/00; C08F 210/18

[52] U.S. Cl. ................. 526/282; 526/169.2; 526/283; 526/336; 524/554; 521/150

[58] Field of Search ............................ 526/282, 283, 526/308, 336; 521/150; 524/554

[56] References Cited

U.S. PATENT DOCUMENTS

| | | | |
|---|---|---|---|
| 4,125,699 | 11/1978 | Yamamoto et al. | 526/282 X |
| 4,200,722 | 4/1980 | Pennings et al. | 526/282 |
| 4,259,468 | 3/1981 | Kajiura et al. | 526/282 X |

FOREIGN PATENT DOCUMENTS

| | | |
|---|---|---|
| 0235381 | 9/1987 | European Pat. Off. . |
| 0332404 | 9/1989 | European Pat. Off. . |
| 0389144 | 9/1990 | European Pat. Off. . |
| 3-146531 | 6/1991 | Japan . |

OTHER PUBLICATIONS

Database WPI, Derwent Publications, AN–88–052839, JP–A–63–008408, Jan. 14, 1988.

*Primary Examiner*—Fred Teskin
*Attorney, Agent, or Firm*—Oblon, Spivak, McClelland, Maier & Neustadt, P.C.

[57] ABSTRACT

A rubber composition excellent in shape-retainability also in processibility, compression set and the like, which comprises a single ethylene-α-olefin-non-conjugated diene copolymer which has (1) a Mooney viscosity ($ML_{1+4}$, 100° C.) of 80 to 200, (2) a weight average molecular weight/number average molecular weight ratio of 6 or more as measured by a gel permeation chromatography (GPC), and (3) a stress-retention of 0.2 or more after 100 seconds at 80° C. in a compression type stress-relaxation test.

10 Claims, 1 Drawing Sheet

RUBBER COMPOSITION

BACKGROUND OF THE INVENTION

This invention relates to a rubber composition which comprises a specific ethylene-α-olefin-non-conjugated diene copolymer and which is particularly suitable for a sponge.

Ethylene-α-olefin-non-conjugated diene copolymers are excellent in heat resistance, ozone resistance, weather resistance and the like and sponges obtained by cross-linking and foaming a rubber composition containing said copolymer have been widely utilized as various sealing materials, wire-coating materials and the like. Such sponges have been industrially produced by continuously extruding a rubber composition through an extruder provided with a die having the predetermined shape to obtain an unvulcanized molded article and then vulcanizing and foaming the unvulcanized molded article in a vulcanizer.

However, rubber compositions containing a conventional ethylene-α-olefin-non-conjugated diene copolymer have such a problem that when vulcanized and foamed by a usual continuous vulcanization method, the rubber compositions tend to be thermally deformed owing to their weights to cause distortion before completion of the vulcanization and foaming and it is difficult to keep the rubber composition in the desired shape. Therefore, the die of the extruder have been made taking the thermal deformation of rubber composition into consideration; however, the making of such a die requires very many steps which have become a severe problem in view of reduction of cost, labor-saving and the like. Moreover, this problem has recently become more important because the crosssectional shape of a sealing material for automobile which is the main use of the sponge has recently become very much complicated and diversified.

In order to improve the shape-retainability of a rubber composition containing an ethylene-α-olefin-non-conjugated diene copolymer, it has heretofore been tried to combine a high molecular weight component copolymer with a low molecular weight component copolymer. For example, Japanese Patent Application Kokai No. 3-146,531 discloses a rubber composition consisting of copolymer rubber A and copolymer rubber B, the copolymer rubber A having a Mooney viscosity ($ML_{1+4}$, 121° C.) of 130 to 195, an ethylene/α-olefin weight ratio of 73/27 to 40/60 and an iodine value of 8 to 33, the copolymer rubber B having a Mooney viscosity ($ML_{1+4}$, 121° C.) of 20 to 55, an ethylene/α-olefin weight ratio of 73/27 to 40/60 and an iodine value of 10 to 36; and Japanese Patent Application Kokai No. 4-80,245 discloses a rubber composition in which the Mooney viscosity ($ML_{1+4}$, 121° C.) is 50 to 100, the ethylene/α-olefin weight ratio is 73/27 to 40/60, the iodine value is 10 to 36, the low molecular weight component copolymer/high molecular weight component copolymer weight ratio is 51/49 to 80/20 and the ratio of the iodine value of the low molecular weight component copolymer to the iodine value of the high molecular weight component copolymer is 1.1/1 to 4/1.

However, when such two kinds of ethylene-α-olefin-non-conjugated diene copolymers are blended, the processes for producing the starting copolymers become complicated and it cannot be said that this method is not always advantageous in industry. In addition, conventional rubber compositions containing such two kinds of ethylene-α-olefin-non-conjugated diene copolymers are still unsatisfactory in an aspect of the balance of characteristics including processibility, shape-retainability, tensile strength, compression set and the like.

SUMMARY OF THE INVENTION

An object of this invention is to provide a rubber composition which is excellent particularly in shape-retainability in spite of using a single ethylene-α-olefin-non-conjugated diene copolymer, and also excellent in processibility, compression set and the like.

Other objects and advantages of this invention will become apparent from the following description.

According to this invention, there is provided a rubber composition comprising a single ethylene-α-olefin-non-conjugated diene copolymer which has:

(1) a Mooney viscosity ($ML_{1+4}$, 100° C.) of 80 to 200,
(2) a ratio of weight average molecular weight/number average molecular weight (referred to hereinafter as Mw/Mn ratio) of 6 or more as measured by a gel-permeation chromatography (GPC), and
(3) a stress-retention after 100 seconds at 80° C. in a compression type stress relaxation test (the stress-retention is referred to hereinafter as Rτ) of 0.2 or more.

DETAILED DESCRIPTION OF THE INVENTION

Ethylene-α-olefin-non-conjugated diene copolymer

Figure 1:
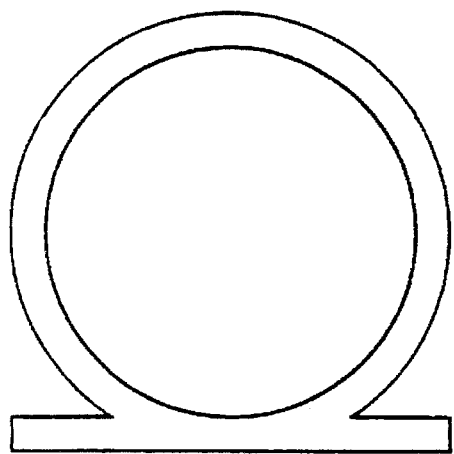
FIG. 1 shows the crosssectional shape of an example of a bench tube-shaped die to be used for the evaluation of a rubber composition.

In the ethylene-α-olefin-non-conjugated diene copolymer (referred to hereinafter as EPDM) used in this invention, the α-olefin includes, for example, α-olefins having 3 to 12 carbon atoms and specific examples thereof include propylene, 1-butene, 3-methyl-1-butene, 1-pentene, 3-methyl-1-pentene, 4-methyl-1-pentene, 3-ethyl-1-pentene, 1-hexene, 1-octene, 1-decene, 1-dodecene and the like. In particular, propylene and 1-butene are preferred. These α-olefins can be used alone or in admixture of two or more.

The above α-olefin is used in such an amount that the ethylene/α-olefin mole ratio becomes preferably 60/40 to 80/20, more preferably 55/45 to 75/25. In this case, when the ethylene/α-olefin mole ratio is less than 60/40, there is a fear that the physical properties of sponge may be deteriorated and when it is more than 80/20, there is a fear that the cold resistance may be deteriorated.

As the non-conjugated diene, there can be used, for example, 5-ethylidene-2-norbornene, dicyclopentadiene, 5-vinyl-2-norbornene, 2,5-norbornadiene, 1,4-pentadiene, 1,4-hexadiene, 1,5-hexadiene, 1,7-octadiene, 1,9-decadiene, 1,11-dodecadiene, 3,6-dimethyl-1,7-octadiene, 4,5-dimethyl-1,7-octadiene and the like. In particular, 5-ethylidene-2-norbornene and dicylopentadiene are preferred. These non-conjugated dienes can be used alone or in admixture of two or more.

The above non-conjugated diene is used in such an amount that the iodine value of EPDM becomes preferably 20 to 40, more preferably 25 to 35. In this case, when the iodine value is less than 20, the vulcanization rate becomes low and the balance between vulcanization and foaming is broken, and hence, there is a fear that the collective characteristics including shape-retainability and sponge characteristics may become unsatisfactory. When it is more than 40, there is a fear that the elongation, tear strength and the like of sponge may be deteriorated.

In this invention, the Mooney viscosity ($ML_{1+4}$, 100° C.) of the EPDM is 80 to 200, preferably 100 to 180. In this case, when the Mooney viscosity is less than 80, the shape-retainability during the vulcanization and foaming is deteriorated and the compression set is damaged, while when it is more than 200, the kneadability and extrudability are damaged.

The Mw/Mn value of the EPDM of this invention as measured by a gel permeation chromatography (GPC) is 6 or more, preferably 6 to 20 and more preferably 8 to 18. In this case, when the Mw/Mn value is less than 6, the shape-retainability during the vulcanization and foaming is deteriorated in some cases.

Moreover, the Rτ of the EPDM of this invention after 100 seconds at 80° C. in the compression type stress relaxation test is at least 0.2, preferably 0.2 to 0.5 and more preferably 0.25 to 0.50. In this case, when the Rτ is less than 0.2, the shape-retainability during the vulcanization and foaming is deteriorated. Incidentally, Rτ is theoretically not more than 1.

The EPDM used in this invention can be produced by a moderate or low pressure polymerization method, for example, a method for polymerizing ethylene, an α-olefin and a non-conjugated diene while, if necessary, supplying hydrogen as a molecular weight modifier, in a suitable solvent in the presence of a Ziegler-Natta catalyst consisting of a transition metal compound and an organometallic compound such as a catalyst consisting of at least one solvent-soluble vanadium compound and at least one organoaluminum compound. In this case, the polymerization can be carried out by a gas phase method (a fluidized bed method or a stirring bed method) or a liquid phase method (a slurry method or a solution method) and can also be carried out by a continuous method or a batch method.

The above solvent-soluble vanadium compound is preferably $VOCl_3$, $VCl_4$, or reaction products of $VOCl_3$ or $VCl_4$ with at least one alcohol. This alcohol includes, for example, methanol, ethanol, n-propanol, isopropanol, n-butanol, sec-butanol, t-butanol, n-hexanol, n-octanol, 2-ethylhexanol, n-decanol, n-dodecanol and the like. Among them, alcohols having 3 to 8 carbon atoms are preferred.

The above organoaluminum compound includes, for example, triethylaluminum, triisobutylaluminum, tri-n-hexylaluminum, diethylaluminum monochloride, diisobutylaluminum monochloride, ethylaluminum sesquichloride, butylaluminum sesquichloride, ethylaluminum dichloride, butylaluminum dichloride, methylaluminoxane which is the reaction product of trimethylaluminum with water, and the like. These organoaluminum compounds can be used alone or in admixture of two or more. Particular preferable organoaluminum compounds are ethylaluminum sesquichloride, butylaluminum sesquichloride, a mixture of ethylaluminum sesquichloride with triisobutylaluminum, a mixture of triisobutylaluminum with butylaluminum sesquichloride.

As the above solvent, non-polar solvents are usually used. The non-polar solvent is preferably n-pentane, n-hexane, n-heptane, n-octane, isooctane, cyclohexane or the like. These non-polar solvents can be used alone or in admixture of two or more.

The EPDM having a specific Rτ value in this invention can be produced by, for example, a method comprising supplying ethylene, an α-olefin and a non-conjugated diene at the predetermined ratio and polymerizing them in a non-polar solvent using a catalyst consisting of an alcohol-modified vanadium compound and an organoaluminum compound in which the Al/V weight ratio has been made small. However, it is also possible to obtain the EPDM by separately producing two kinds of EPDMs having a low molecular weight and a high molecular weight, blending a low molecular weight EPDM solution with a high molecular weight EPDM solution in which solutions the ethylene/α-olefin mole ratio, the iodine value and the like are appropriately selected, so as to give the desired Mooney viscosity ($ML_{1+4}$, 100° C.), Mw/Mn value and Rτ, and then drying the resulting blend.

The single EPDM polymerized or blended in solution as above described can solve the problem of bad dispersion caused by the differences of molecular weight between low molecular weight EPDM and high molecular weight EPDM, which occurs when both of those EPDM are blended in mixing, as done in prior art.

Here, an example of the production of the EPDM to be used in this invention (Table 1, EPDM-1) is described below.

Example of Production of EPDM-1

An autoclave having an inner volume of 20 liters was used, and continuous polymerization was conducted therein under such conditions that the n-hexane-feeding rate was 8 liters/hour; the residence time was 45 minutes; the ethylene/propylene mole ratio in the gas phase was 0.73; the hydrogen concentration in the gas phase was 7 mole %; the 5-ethylidene-2-norbornene-feeding rate was 80 g/hour; the dicylo-pentadiene-feeding rate was 23 g/hour; as a catalyst, a vanadium compound separately prepared by adding two moles of 1-butanol per one mole of vanadium oxytrichloride and subjecting the mixture to dehydrochlorination with a nitrogen gas was fed in a proportion of 0.4 millimole of the vanadium compound per liter of the n-hexane and ethylaluminum sesquichloride was fed in a proportion of 2.8 millimoles per liter of the n-hexane; the polymerization temperature was 40° C.; and the polymerization pressure was 6 $Kg/cm^2 \cdot G$.

Compounding components

The rubber composition of this invention is formed into a vulcanizable rubber composition by adding, to the above EPDM, compounding components which are used in conventional rubber compositions such as a filler, a process oil, a vulcanizing agent, a vulcanization accelerator, an activator, a foaming agent and the like.

In the preparation of the vulcanizable rubber composition, it is desirable to adjust the Mooney viscosity ($ML_{1+4}$, 100° C.) after the addition of the compounding components to preferably 30 to 60, more preferably 35 to 55.

The above filler is preferably, for example, carbon black such as FEF, SRF, GPF or the like. However, in some cases, there may be used, in place of the carbon black, a white filler, for example, wet or dry silica; a silicic acid salt such as clay, talc, wollastonite or the like; a carbonic acid salt such as calcium bicarbonate, magnesium carbonate or the like; a metal oxide such as zinc oxide, aluminum oxide, titanium oxide or the like; a coupling agent thereof; a surface-treating agent such as a fatty acid or the like; etc.

The amount of the above filler added is, when it is carbon black, preferably not more than 150 parts by weight, more preferably not more than 100 parts by weight, per 100 parts by weight of the EPDM, and when it is a white filler, preferably not more than 100 parts by weight, more preferably 50 parts by weight, per 100 parts by weight of the EPDM.

The above process oil includes those of the aromatic type, the naphthenic type, the paraffinic type and the like which are usually used in rubbers, and particularly preferable are the naphthenic type process oil and the paraffinic type process oil. These process oils can be used alone or in admixture of two or more.

The amount of the process oil added is preferably not more than 150 parts by weight, more preferably not more than 100 parts by weight, per 100 parts by weight of the EPDM.

The above vulcanizing agent includes, for example, sulfur such as powdery sulfur, precipitated sulfur, colloid sulfur, insoluble sulfur or the like; an inorganic vulcanizing agent such as sulfur chloride, selenium, tellurium or the like; a sulfur-containing organic compound such as a morpholine disulfide, an alkylphenol disulfide, a thiuram disulfide, a dithiocarbamic acid or the like; etc. These vulcanizing agents can be used alone or in admixture of two or more.

The amount of the vulcanizing agent added is varied depending upon the kind of vulcanizing agent, the iodine value of rubber composition and the like; however, it is preferably not more than 5 parts by weight, more preferably not more than 3 parts by weight, per 100 parts by weight of the EPDM.

The above vulcanization accelerator includes, for example, an aldehyde ammonia such as hexamethylenetetramine, acetaldehyde ammonia or the like; a guanidine such as diphenyl guanidine, di(o-tolyl) guanidine, o-tolyl-biguanidine or the like; a thiourea such as thiocarbanilide, di(o-tolyl)thiourea, N,N'-diethylthiourea, tetramethylthiourea, trimethylthiourea, dilaurylthiourea or the like; a benzothiazole such as mercaptobenzothiazole, dibenzothiazole disulfide, 2-(4-morpholinothio) benzothiazole, 2-(2,4-dinitrophenyl)mercaptobenzothiazole, N,N'-(diethylthiocarbamoylthio)benzothiazole or the like; a sulfenamide such as N-t-butyl-2-benzothiazyl sulfenamide, N,N'-dicyclohexyl-2-benzothiazyl sulfenamide, N,N'-diisopropyl-2-benzothiazyl sulfenamide, N-cyclohexyl-2-benzothiazyl sulfenamide or the like; a thiuram such as tetramethylthiuram disulfide, tetraethylthiuram disulfide, tetrabutylthiuram disulfide, tetramethylthiuram monosulfide, dipentamethylenethiuram tetrasulfide or the like; a thiocarbamic acid salt such as zinc dimethylthiocarbamate, zinc diethylthiocarbamate, zinc di-n-butylthiocarbamate, zinc ethylphenyldithiocarbamate, sodium dimethyldithiocarbamate, copper dimethyldithiocarbamate, tellurium dimethylthiocarbamate, iron dimethylthiocarbamate or the like; a xanthogenic acid salt such as zinc butylthioxanthogenate, zinc isopropylxanthogenate or the like; etc. These vulcanization accelerators can be used alone or in admixture of two or more.

The amount of the above vulcanization accelerator added is preferably not more than 10 parts by weight, more preferably not more than 8 parts by weight, per 100 parts by weight of the EPDM.

The above activator includes, for example, a metal oxide such as magnesium oxide, zinc oxide, active zinc oxide, litharge, red lead oxide, white lead or the like; an organic acid such as stearic acid, oleic acid and the like; an organic acid salt such as zinc stearate and the like; etc. Zinc oxide and active zinc oxide are particularly preferable. These activators can be used alone or in admixture of two or more.

The amount of the above activator added is preferably not more than 30 parts by weight, more preferably not more than 15 parts by weight, per 100 parts by weight of the EPDM.

The above foaming agent includes, for example, an inorganic foaming agent such as ammonium carbonate, sodium bicarbonate, anhydrous sodium nitrate or the like; or an organic foaming agent such as dinitrosopentamethylenetetramine, N,N'-dimethyl-N,N'-dinitrosoterephthalamide, benzenesulfonyl hydrazide, p,p'-oxybis(benzenesulfonyl hydrazide) (referred to hereinafter as OBSH), 3,3'-disulfonhydrazidophenylsulfone, azodicarbonamide, azobisformamide or the like. OBSH is particularly preferable. As the OBSH, preferable are Neocellborn #1000 (a trade name of Eiwa Kasei K. K.), Cellmic S (a trade name of Sankyo Kasei K. K.), Celogen OT (a trade name of Uniroyal Chemical Inc.) or the like. These foaming agents can be used alone or in admixture of two or more.

Together with the above foaming agent, there can be used a foaming adjuvant of the urea type, the organic acid type, the metal salt type or the like.

The amounts of the above foaming agent and the above foaming adjuvant added can be varied depending upon the kinds thereof and the desired expansion degree; however, the amount of the foaming agent is preferably 1 to 6 parts by weight, more preferably 2 to 5 parts by weight, per 100 parts by weight of the EPDM and the amount of the foaming adjuvant is preferably not more than 20 parts by weight per 100 parts by weight of the EPDM.

Moreover, for improving the flow properties of the rubber composition of this invention, there may be compounded therewith a processing aid, for example, a paraffin wax; a liquid paraffin; polyethylene wax; a fatty acid ester; a fatty acid amide; a special processing aid such as Ekusuton K-1 (a trade name of Kawaguchi Kagaku Kogyo K. K.), Sunaid HP (a trade name of Sanshin Kagaku Kogyo K. K.), Yodoplast P (a trade name of Yodogawa Kasei K. K.), TE-80 (a trade name of Technical Processing Inc.), Aktiplast (a trade name of Rhein Chemie Inc.), Aflux 42 (a trade name of Rhein Chemie Inc.), Struktol WB212 (a trade name of Schill & Sellachef); or the like. These processing aids can be used alone or in admixture of two or more.

The amount of the above processing aid added is preferably not more than 10 parts by weight, more preferably not more than 5 parts by weight, pre 100 parts by weight of the EPDM.

The rubber composition of this invention may also contain an antioxidant. This antioxidant includes, for example, n-octadecyl-3-(4'-hydroxy-3',5'-di-t-butylphenyl) propionate, tetrakis{methylene-3-(3',5'-di-t-butyl-4'-hydroxyphenyl)propionate}methane and the like. These antioxidants can be used alone or in admixture of two or more.

The amount of the above antioxidant added is preferably not more than 5 parts by weight, more preferably not more than 3 parts by weight, per 100 parts by weight of the EPDM.

The rubber composition of this invention may further contain another additive such as a dehydrating agent, a plasticizer, an age resistor, a thermal stabilizer, an ultraviolet absorber, a lubricant, a release agent, a flame retardant, an antistatic agent, a dye pigment, a fungiproof agent or the like, and may also have compounded therewith another polymer such as natural rubber, polyisoprene rubber, polybutadiene rubber, styrene-butadiene rubber, acrylonitrile-butadiene rubber, butyl rubber, acrylic rubber, ethylene-α-olefin rubber, low density polyethylene, straight chain low density polyethylene, medium density polyethylene, high density polyethylene, polypropylene or the like.

The method of preparing the rubber composition of this invention is not critical, and includes, for example, a method which comprises kneading the EPDM with carbon black, a process oil, an activator, a processing aid, a release agent or the like using an internal mixer such as a roll mill, Banbury mixer, intermixer, a pressurized kneader or the like; a continuously kneading machine; or the like and then kneading the resulting mixture with a vulcanizing agent, a vulcanization accelerator, a foaming agent, a dehydrating agent or the like by means of a roll mill, a pressurized kneader or the like. Also, there can be adopted a method which comprises previously kneading the EPDM with a part of the compounding components by means of a roll mill, a Banbury mixer or the like, feeding the mixture to an extruder and feeding separately the remaining compounding components to the extruder, and a method which comprises feeding the EPDM and all the compounding components and kneading them therein.

The rubber composition thus prepared can be formed into the desired sponge according to a conventional procedure for producing a sponge, for example, a method which comprises heating the rubber composition in the mold of a known cross-linking and foaming apparatus to vulcanize and foam the composition, a method which comprises molding the rubber composition into the desired shape using an extruder and then heating the molded article obtained in a vulcanizer, or the like. The heating temperature in the above vulcanizing and foaming step is preferably 150° to 280° C., more preferably 180° to 250° C. and the heating time is preferably 2 to 15 minutes, more preferably 3 to 10 minutes.

The rubber composition of this invention is excellent particularly in shape-retainability in the vulcanizing and foaming step and also excellent in processibility, compression set and the like. Accordingly, the rubber composition of this invention can be very suitably used particularly in the form of a sponge in a sealing material for automobile such as a door seal, a roof side rail, a trunk seal or the like, and is useful in a wide use including sealing materials for other transportation machines, sealing materials for civil engineering and construction, sealing materials for general machines and apparatuses, coatings for wires and the like.

DESCRIPTION OF THE PREFERRED EMBODIMENTS

Examples and Comparative Examples are shown below to explain this invention in more detail. However, this invention should not be construed to be limited thereto.

In the Examples and Comparative Examples, the measurements and evaluations were effected as follows.

(A) Stress-retention

The EPDM was pressure-molded at 130° C. by a press and then cooled to form a sheet having a thickness of 6 mm. From this sheet, a cylindrical test piece having a diameter of 13 mm was prepared by use of a drilling machine. This test piece was subjected to a stress relaxation test at 80° C. at a compression of 20% using an automatic stress relaxation meter manufactured by Shimada Giken K. K. to determine the ratio of the stress value after the 20% compression was kept for 100 seconds to the stress value just after the 20% compression was reached. This ratio is indicated as the stress retention.

(B) Roll-processability

A test sample was wound round the front roll of a 10-inch twin roll under the conditions that the roll surface temperature was 50° C., the guide width was 30 cm, the nip was 2.5 mm, the ratio of the number of revolutions of the front roll to the number of revolutions of the back roll was 24/20, and the state of the wound sample was evaluated visually.

(C) Mooney viscosity ($ML_{1+4}$, 100° C.) of compounded rubber composition

One of the EPDMs shown in Table 1 was used to prepare an unvulcanized rubber composition with the compounding recipe shown in Table 2, and this unvulcanized rubber composition was subjected to measurement of viscosity at a test temperature of 100° C. using an L-shaped rotor according to JIS K6300.

(D) Mooney scorch test

An unvulcanized rubber composition with the compounding recipe shown in Table 2 was subjected to measurement of Vm and t5 (min) according to JIS K6300 at a test temperature of 125° C. using an L-shaped rotor.

(E) Shape-retainability (%)

Figure 2:
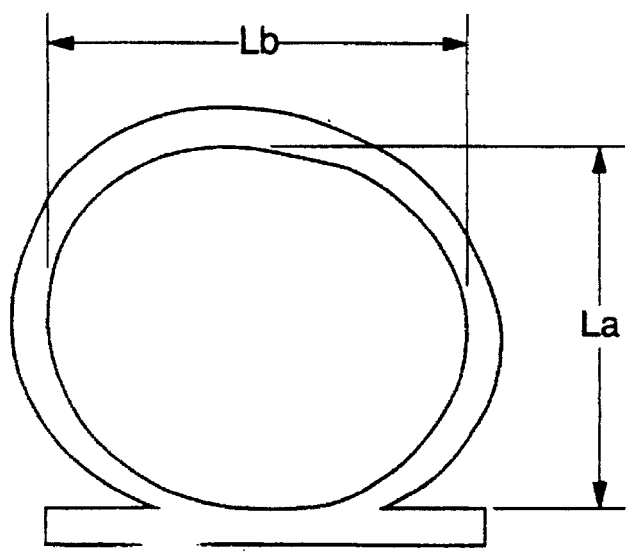
FIG. 2 shows the crosssectional shape of an example of a bench tube-shaped sponge molded article after being allowed to stand.

An unvulcanized rubber composition with the compounding recipe shown in Table 2 was extrusion-molded using the bench tube-like die shown in FIG. 1 to obtain a molded article, and this molded article was kept horizontally in an oven at 220° C. for 7 minutes to be vulcanized and foamed, thereby obtaining a bench tube-like sponge molded article. This sponge molded article was allowed to stand at room temperature and evaluated from the value of La/Lb×100 in which La refers to the height in FIG. 2 at room temperature and Lb to the width in FIG. 2 at room temperature. An example of the crosssectional shape of the bench tube-like sponge molded article after the same was allowed to stand is shown in FIG. 2.

(F) Specific gravity

Evaluated according to the expanded rubber physical test method defined in the Society of Rubber Industrial Japan Standards.

(G) Tensile test

The bench portion of the bench tube-like sponge molded article obtained in the same manner as in (E) above (Shape-retainability) was cut off to separate the tube-like portion, and a test piece was punched out of this portion by means of a No. 2-dumbbell, and subjected to a tensile test at a drawing rate of 200 mm/min to measure the tensile strength [TB (MPa)] and elongation [EB (%)].

(H) Compression set (%)

To the sponge molded article obtained in the same manner as in (E) above (Shape-retainability) was applied a 50% compression strain in the direction of height in FIG. 2, and the molded article was subjected in this state to heat treatment in an oven at 70° C. for 200 hours and then allowed to stand at room temperature for 30 minutes, after which the remaining strain in the height direction was determined.

EXAMPLES 1 TO 8 AND COMPARATIVE EXAMPLES 1 TO 6

One of the EPDMs shown in Table 1 was used to prepare an unvulcanized rubber composition having the compounding recipe shown in Table 2, and this composition was subjected to measurement and evaluation according to the above-mentioned procedures. The results obtained are shown in Tables 3 and 4.

TABLE 1

| EPDM (*3) | Mooney viscosity (ML$_{1+4}$, 100° C.) | Mw/Mn | Stress-retention (Rτ) | ET/PR mole ratio (*1) | ENB/DCP mole ratio (*2) |
|---|---|---|---|---|---|
| EPDM-1 | 150 | 13 | 0.29 | 72/28 | 25/5 |
| EPDM-2 | 100 | 10 | 0.25 | 69/31 | 25/5 |
| EPDM-3 | 130 | 16 | 0.28 | 70/30 | 35/0 |
| EPDM-4 | 180 | 11 | 0.30 | 70/30 | 30/0 |
| EPDM-5 | 135 | 3 | 0.11 | 67/33 | 30/0 |
| EPDM-6 | 105 | 4 | 0.11 | 69/31 | 35/0 |
| EPDM-7 | 105 | 4 | 0.14 | 72/28 | 30/0 |
| EPDM-8 | 135 | 5 | 0.18 | 68/32 | 25/5 |
| EPDM-9 | 100 | 10 | 0.22 | 72/28 | 45/0 |
| EPDM-10 | 75 | 10 | 0.16 | 72/28 | 25/5 |
| EPDM-11 | 220 | 18 | 0.33 | 70/30 | 25/5 |
| EPDM-12 | 150 | 15 | 0.25 | 82/21 | 30/0 |
| EPDM-13 | 150 | 12 | 0.23 | 50/50 | 25/0 |
| EPDM-14 | 135 | 10 | 0.20 | 70/30 | 25/0 |

Note:
(*1) Ethylene/propylene ratio
(*2) 5-Ethylidene-2-norbornene/dicyclopentadiene mole ratio
(*3) EPDM-1 to EPDM-14 are manufactured by Japan Synthetic Rubber Co., Ltd.

TABLE 2

| Compounding recipe | Parts by wt. |
|---|---|
| EPDM | 100 |
| Asahi #50HG (*1) | 95 |
| Daianaprocess PW380 (*2) | Varied (*) |
| Active zinc oxide (*3) | 5 |
| Stearic acid (*4) | 2 |
| Struktol WB212 (*5) | 2 |
| Hitanol 1501 (*6) | 1 |
| PEG4000S (*7) | 1 |
| Vesta PP (*8) | 5 |
| Sanceler M (*9) | 0.5 |
| Sanceler PZ (*10) | 1 |
| Sanceler BZ (*11) | 0.4 |
| Sanceler TRA (*12) | 0.8 |
| Sanceler TET (*13) | 0.5 |
| Vulnoc R (*14) | 0.5 |
| Powdered sulfur (*15) | 1 |
| Neocellborn N1000 (*16) | 3.5 |
| Cellton NP (*17) | 0.3 |

Note:
(*): see Table 3.
In Table 2, (*1) to (*17) refer to the following:
(*1): Carbon black manufactured by Asahi Carbon K. K.
(*2): Process oil manufactured by Idemitsu Kosan K. K.
(*3): Activator manufactured by Sakai Kagaku Kogyo K. K.
(*4): Activating agent and release agent manufactured by Kao Sekken K. K.
(*5): Processing aid manufactured by Sil Zailaher Corp.
(*6): Processing aid (tackifier) manufactured by Hitachi Chemical Co., Ltd.
(*7): Activator manufactured by Sanyo Kasei Kogyo K. K.
(*8): Dehydrating agent manufactured by Inoue Sekkai K. K.
(*9): Vulcanization accelerator manufactured by Sanshin Kagaku Kogyo K. K.
(*10): Vulcanization accelerator manufactured by Sanshin Kagaku Kogyo K. K.
(*11): Vulcanization accelerator manufactured by Sanshin Kagaku Kogyo K. K.
(*12): Vulcanization accelerator manufactured by Sanshin Kagaku Kogyo K. K.
(*13): Vulcanization accelerator manufactured by Sanshin Kagaku Kogyo K. K.
(*14): Vulcanizing agent manufactured by Ouchi Shinko Kagaku Kogyo K. K.
(*15): Vulcanizing agent manufactured by Tsurumi Kagaku Kogyo K. K.
(*16): Foaming agent manufactured by Eiwa Kasei K. K.
(*17): Foaming adjuvant manufactured by Sankyo Kasei K. K.

TABLE 3

| | Example 1 | Example 2 | Example 3 | Example 4 | Comp. Ex. 1 | Comp. Ex. 2 | Comp. Ex. 3 |
|---|---|---|---|---|---|---|---|
| Kind of EPDM | EPDM-1 | EPDM-2 | EPDM-3 | EPDM-4 | EPDM-5 | EPDM-6 | EPDM-7 |
| Amount of process oil (part by wt.) | 70 | 55 | 70 | 75 | 70 | 55 | 55 |
| Evaluation | | | | | | | |
| Roll-processability | Good | Good | Good | Good | Good | Good | Good |
| Mooney viscosity (ML$_{1+4}$, 100° C.) | 35 | 33 | 36 | 45 | 45 | 34 | 43 |
| Mooney scorch test | | | | | | | |
| Vm | 35 | 33 | 36 | 42 | 40 | 32 | 39 |
| t5 (min) | 3.7 | 3.6 | 3.2 | 3.3 | 3.6 | 3.2 | 3.7 |
| Shape-retention (%) | 83 | 81 | 82 | 82 | 70 | 60 | 67 |
| Physical properties of sponge | | | | | | | |
| Specific gravity | 0.47 | 0.44 | 0.52 | 0.55 | 0.48 | 0.45 | 0.48 |
| Tensile test | | | | | | | |
| TB (MPa) | 2.0 | 1.8 | 1.9 | 2.2 | 2.5 | 1.8 | 2.3 |
| EB (%) | 270 | 260 | 280 | 300 | 270 | 280 | 270 |
| Compression set (70° C. × 200 hrs) | 28 | 29 | 24 | 23 | 23 | 30 | 24 |

TABLE 4

| | Comp. Ex. 4 | Comp. Ex. 5 | Comp. Ex. 6 | Example 5 | Example 6 | Example 7 | Example 8 |
|---|---|---|---|---|---|---|---|
| | | | | Kind of EPDM | | | |
| | EPDM-8 | EPDM-9 | EPDM-10 | EPDM-11 | EPDM-12 | EPDM-13 | EPDM-14 |
| Amount of process oil (part by wt.) | 70 | 55 | 80 | 70 | 70 | 70 | 55 |
| Evaluation | | | | | | | |
| Roll-processability | Good | Good | Inferior | Good | Good | Good | Good |
| Mooney viscosity ($ML_{1+4}$, 100° C.) | 41 | 30 | 51 | 38 | 36 | 33 | 34 |
| Mooney scorch test | | | | | | | |
| Vm | 37 | 28 | 46 | 36 | 35 | 33 | 34 |
| t5 (min) | 3.9 | 3.6 | 3.3 | 3.2 | 3.5 | 3.6 | 2.9 |
| Shape-retention (%) | 75 | 70 | 84 | 82 | 80 | 78 | 85 |
| Physical properties of sponge | | | | | | | |
| Specific gravity | 0.44 | 0.41 | 0.59 | 0.46 | 0.44 | 0.43 | 0.48 |
| Tensile test | | | | | | | |
| TB (MPa) | 1.6 | 1.8 | 3.0 | 2.3 | 2.2 | 2.0 | 2.1 |
| EB (%) | 270 | 280 | 280 | 270 | 280 | 270 | 280 |
| Compression set (70° C. × 200 hrs) | 27 | 32 | 26 | 27 | 28 | 29 | 22 |

As is clear from Table 3 and Table 4, the rubber composition for sponge of this invention is excellent particularly in shape-retainability and also excellent in processibility, tensile strength, elongation, compression set and the like.

What is claimed is:

1. A rubber composition comprising a single ethylene-α-olefin-non-conjugated diene copolymer in which the non-conjugated diene is a combination of 5-ethylidene-2-norbornene and dicyclopentadiene, and which has (1) a Mooney viscosity ($ML_{1+4}$, 100° C.) of 80 to 200, (2) a weight average molecular weight/number average molecular weight ratio of 6 or more as measured by a gel permeation chromatography (GPC), and (3) a stress-retention of 0.2 or more after 100 seconds at 80° C. in the compression type stress-relaxation test.

2. The rubber composition according to claim 1, wherein the α-olefin in the ethylene-α-olefin-non-conjugated diene copolymer is an α-olefin having 3 to 12 carbon atoms.

3. The rubber composition according to claim 2, wherein the α-olefin is at least one member selected from the group consisting of propylene and 1-butene.

4. The rubber composition according to claim 1, wherein the ethylene/α-olefin mole ratio in the ethylene-α-olefin-non-conjugated diene copolymer ranges from 55/45 to 75/25.

5. The rubber composition according to claim 1, wherein the non-conjugated diene is contained in such an amount that the iodine value of the ethylene-α-olefin-non-conjugated diene copolymer is 25 to 35.

6. The rubber composition according to claim 1, wherein the Mooney viscosity ($ML_{1+4}$, 100° C.) of the ethylene-α-olefin-non-conjugated diene copolymer is 100 to 180.

7. The rubber composition according to claim 1, wherein the weight average molecular weight/number average molecular weight mole ratio is 8 to 18.

8. The rubber composition according to claim 1, wherein the stress-retention is 0.25 to 0.50.

9. The rubber composition according to claim 1, which has compounded therewith rubber compounding components, is sulfur-vulcanizable and has a Mooney viscosity ($ML_{1+4}$, 100° C.) of 35 to 55.

10. The rubber composition according to claim 1, which contains at least one foaming agent selected from the group consisting of inorganic foaming agents and organic foaming agents in an amount of 2 to 5 parts by weight per 100 parts by weight of the ethylene-α-olefin-non-conjugated diene copolymer.

* * * * *